US012251702B2

(12) United States Patent
Kaplan et al.

(10) Patent No.: US 12,251,702 B2
(45) Date of Patent: Mar. 18, 2025

(54) FLOWCELL CARTRIDGE WITH FLOATING SEAL BRACKET

(71) Applicant: Illumina, Inc., San Diego, CA (US)

(72) Inventors: David Elliott Kaplan, Carlsbad, CA (US); Anthony John de Ruyter, San Diego, CA (US); Richard Alan Kelley, San Diego, CA (US); Ashish Kumar, San Diego, CA (US)

(73) Assignee: Illumina, Inc., San Diego, CA (US)

( * ) Notice: Subject to any disclaimer, the term of this patent is extended or adjusted under 35 U.S.C. 154(b) by 0 days.

(21) Appl. No.: 18/827,174

(22) Filed: Sep. 6, 2024

(65) Prior Publication Data

US 2024/0424500 A1 Dec. 26, 2024

Related U.S. Application Data

(60) Continuation of application No. 18/167,836, filed on Feb. 11, 2023, now Pat. No. 12,097,502, which is a (Continued)

(30) Foreign Application Priority Data

Mar. 24, 2017 (GB) ..................................... 1704769

(51) Int. Cl.
*B01L 9/00* (2006.01)
*B01L 3/00* (2006.01)

(52) U.S. Cl.
CPC ......... *B01L 9/527* (2013.01); *B01L 3/502715* (2013.01); *B01L 2200/025* (2013.01); (Continued)

(58) Field of Classification Search
CPC ............... B01L 3/502715; B01L 9/527; B01L 2200/025; B01L 2200/027; B01L 2200/04;
(Continued)

(56) References Cited

U.S. PATENT DOCUMENTS 6,132,685 A 10/2000 Kercso et al.
6,309,608 B1 10/2001 Zhou et al.
(Continued)

FOREIGN PATENT DOCUMENTS

CN 2792855 Y 7/2006
CN 1972744 A 5/2007
(Continued)

OTHER PUBLICATIONS

Illumina, NextSeq 500 System Guide, Document # 15046563 v01, Oct. 2015 (Year: 2015).*
(Continued)

*Primary Examiner* — Dean Kwak
(74) *Attorney, Agent, or Firm* — Weaver Austin Villeneuve & Sampson LLP

(57) ABSTRACT

A cartridge for use with chemical or biological analysis systems, as well as methods of using the same, is provided. The cartridge may include a floating microfluidic plate that is held in the cartridge using one or more floating support brackets that incorporate gaskets that may seal against fluidic ports on the microfluidic plate. The floating support brackets may include indexing features that may align the microfluidic plate with the seals.

11 Claims, 9 Drawing Sheets

Related U.S. Application Data division of application No. 16/777,881, filed on Jan. 30, 2020, now Pat. No. 11,577,253, which is a division of application No. 16/436,485, filed on Jun. 10, 2019, now Pat. No. 10,549,282, which is a continuation of application No. 15/841,109, filed on Dec. 13, 2017, now Pat. No. 10,357,775.

(60) Provisional application No. 62/441,927, filed on Jan. 3, 2017.

(52) U.S. Cl.
CPC ..... *B01L 2200/027* (2013.01); *B01L 2200/04* (2013.01); *B01L 2200/0689* (2013.01); *B01L 2300/041* (2013.01); *B01L 2300/0609* (2013.01); *B01L 2300/0809* (2013.01); *B01L 2300/0816* (2013.01); *B01L 2300/0822* (2013.01); *B01L 2300/0877* (2013.01)

(58) Field of Classification Search
CPC ....... B01L 2200/0689; B01L 2300/041; B01L 2300/0877; B01L 2300/022; B01L 2300/043; B01L 2300/0609; B01L 2300/0809; B01L 2300/0816; B01L 7/52; B01L 2300/0822
See application file for complete search history.

(56) References Cited

U.S. PATENT DOCUMENTS

| | | | | |
|---|---|---|---|---|
| 6,326,212 | B1 | 12/2001 | Aoki | |
| 6,432,366 | B2 | 8/2002 | Ruediger et al. | |
| 6,977,722 | B2 | 12/2005 | Wohlstadter et al. | |
| 7,981,362 | B2 | 7/2011 | Glezer et al. | |
| 8,282,896 | B2 | 10/2012 | Facer et al. | |
| 8,354,080 | B2 | 1/2013 | Tsao et al. | |
| 8,828,736 | B2 | 9/2014 | Perroud et al. | |
| 9,089,844 | B2 | 7/2015 | Hiddessen et al. | |
| 9,103,785 | B2 | 8/2015 | Okura et al. | |
| 9,410,977 | B2 | 8/2016 | Stone et al. | |
| 10,357,775 | B2 | 7/2019 | Kaplan et al. | |
| 10,549,282 | B2 | 2/2020 | Kaplan et al. | |
| 11,577,253 | B2 | 2/2023 | Kaplan et al. | |
| 12,097,502 | B2 | 9/2024 | Kaplan et al. | |
| 2003/0012712 | A1 | 1/2003 | Norris | |
| 2003/0159742 | A1 | 8/2003 | Karp et al. | |
| 2004/0029258 | A1 | 2/2004 | Heaney et al. | |
| 2004/0109793 | A1* | 6/2004 | McNeely | B81C 1/00119 422/400 |
| 2004/0141887 | A1* | 7/2004 | Mainquist | B01L 3/50855 422/400 |
| 2005/0170493 | A1* | 8/2005 | Patno | C12N 15/1003 435/288.5 |
| 2005/0201902 | A1 | 9/2005 | Reinhardt et al. | |
| 2007/0151212 | A1 | 7/2007 | Mayer et al. | |
| 2009/0010820 | A1 | 1/2009 | Fehm et al. | |
| 2009/0129980 | A1 | 5/2009 | Lawson et al. | |
| 2009/0215194 | A1* | 8/2009 | Magni | B01L 3/502707 422/68.1 |
| 2009/0241833 | A1 | 10/2009 | Moshtagh et al. | |
| 2010/0159590 | A1 | 6/2010 | Alley et al. | |
| 2011/0008223 | A1 | 1/2011 | Tsao et al. | |
| 2011/0139274 | A1 | 6/2011 | Kennedy et al. | |
| 2012/0143531 | A1 | 6/2012 | Davey et al. | |
| 2012/0244043 | A1 | 9/2012 | Leblanc et al. | |
| 2012/0270305 | A1* | 10/2012 | Reed | B01L 9/527 422/560 |
| 2013/0203634 | A1 | 8/2013 | Jovanovich et al. | |
| 2013/0210682 | A1 | 8/2013 | Eltoukhy et al. | |
| 2013/0295601 | A1 | 11/2013 | Park et al. | |
| 2014/0073514 | A1 | 3/2014 | Shen et al. | |
| 2014/0179021 | A1 | 6/2014 | Parkinson | |
| 2014/0271407 | A1 | 9/2014 | Knorr et al. | |
| 2015/0021502 | A1 | 1/2015 | Vangbo | |
| 2015/0151297 | A1 | 6/2015 | Williamson et al. | |
| 2016/0018347 | A1 | 1/2016 | Drbal et al. | |
| 2016/0214102 | A1 | 7/2016 | Oldham et al. | |
| 2016/0281150 | A1* | 9/2016 | Rawlings | G01N 21/253 |
| 2016/0289729 | A1 | 10/2016 | Richards et al. | |
| 2016/0368258 | A1 | 12/2016 | Karam et al. | |
| 2017/0097369 | A1 | 4/2017 | Durrant et al. | |
| 2018/0015474 | A1* | 1/2018 | Arlett | B01L 3/527 |
| 2023/0191416 | A1 | 6/2023 | Kaplan et al. | |
| 2024/0399382 | A1 | 12/2024 | Kaplan et al. | |

FOREIGN PATENT DOCUMENTS

| | | | |
|---|---|---|---|
| CN | 101037040 | A | 9/2007 |
| CN | 101082621 | A | 12/2007 |
| CN | 101084364 | A | 12/2007 |
| CN | 101258402 | A | 9/2008 |
| CN | 101505872 | A | 8/2009 |
| CN | 101520960 | B | 9/2010 |
| CN | 103402639 | A | 11/2013 |
| CN | 103501907 | A | 1/2014 |
| CN | 104498353 | A | 4/2015 |
| CN | 104582850 | A | 4/2015 |
| CN | 204429320 | U | 7/2015 |
| CN | 105122070 | A | 12/2015 |
| CN | 105828945 | A | 8/2016 |
| CN | 106104254 | A | 11/2016 |
| CN | 214973877 | U | 12/2021 |
| EA | 008075 | B1 | 2/2007 |
| EP | 1289658 | A2 | 3/2003 |
| EP | 3326719 | A1 | 5/2018 |
| EP | 3471880 | B1 | 4/2021 |
| JP | S6224141 | A | 2/1987 |
| JP | 2012519857 | A | 8/2012 |
| JP | 3187946 | U | 12/2013 |
| JP | 2016532111 | A | 10/2016 |
| RU | 2422204 | C2 | 6/2011 |
| RU | 2612904 | C1 | 3/2017 |
| RU | 2658495 | C1 | 6/2018 |
| TW | 201632261 | A | 9/2016 |
| WO | WO-03087410 | A1 | 10/2003 |
| WO | WO-2005014175 | A1 | 2/2005 |
| WO | WO-2007107901 | A3 | 12/2007 |
| WO | WO-2008147428 | A1 | 12/2008 |
| WO | WO-2009046348 | A1 | 4/2009 |
| WO | WO-2010102194 | A1 | 9/2010 |
| WO | WO-2012061444 | A2 | 5/2012 |
| WO | WO-2012096703 | A1 | 7/2012 |
| WO | WO-2015073999 | A1 | 5/2015 |
| WO | WO-2016154038 | A1 | 9/2016 |
| WO | WO-2016154193 | A1 | 9/2016 |
| WO | WO-2016172724 | A1 | 10/2016 |
| WO | WO-2016196210 | A2 | 12/2016 |
| WO | WO-2018128839 | A1 | 7/2018 |

OTHER PUBLICATIONS

Illumina NextSeq 500 Kit Reference Guide, Part # 18048775 Rev. G, Dec. 2014 (Year: 2014).*

Illumina NextSeq 500 System Guide, Document #15046563 v04, May 2018 (Year: 2018).*

Krupin O., et al., "Biosensing Using Straight Long-range Surface Plasmon Waveguides," Optics Express, Jan. 14, 2013, vol. 21 (1), pp. 698-709.

Ambardar et al., "High throughput sequencing: an overview of sequencing chemistry," Indian Journal of Microbiology, Jul. 9, 2016.

Illumina , "NextSeq 500 System Guide", Oct. 2015, 78 pages,URL: http://www.well.ox.ac.uk/ogc/wp-content/uploads/2017/09/nextseq-500-system-guide-15045563-01pdf.

Liu et al., "Microfluidic chip flow cytometry," Microelectronics, Oct. 20, 2009, pp. 696-703.

Ilumina NextSeq 500 Kit Reference Guide, Dec. 2014.

(56) References Cited

OTHER PUBLICATIONS

Ilumina NextSeq 500 System Guide, Document #15046563 v04. May 2018.
Ilumina NextSeq Flowcell Cartridge Figures dated Jan. 3, 2016.

* cited by examiner

FLOWCELL CARTRIDGE WITH FLOATING SEAL BRACKET

CROSS-REFERENCE TO RELATED APPLICATION

This application is a continuation application under 35 U.S.C. § 120 of U.S. patent application Ser. No. 18/167,836, filed Feb. 11, 2023, which is a divisional of U.S. patent application Ser. No. 16/777,881, filed Jan. 30, 2020, and issued as U.S. Pat. No. 11,577,253 on Feb. 14, 2023, which is itself a divisional application under 35 U.S.C. § 120 of U.S. patent application Ser. No. 16/436,485, filed Jun. 10, 2019, and issued as U.S. Pat. No. 10,549,282 on Feb. 4, 2020, and which is itself a continuation of U.S. patent application Ser. No. 15/841,109, filed Dec. 13, 2017, which issued as U.S. Pat. No. 10,357,775 on Jul. 23, 2019, and which claims benefit of priority to United Kingdom (GB) application 1704769.7, filed Mar. 24, 2017, and also claims benefit of priority under 35 U.S.C. § 119 (e) to U.S. Patent Application No. 62/441,927, filed Jan. 3, 2017, all of which are hereby incorporated by reference herein in their entireties.

BACKGROUND

Sequencers, e.g., genome sequencers, such as DNA sequencers or RNA sequencers, and other biological or chemical analysis systems may sometimes utilize microfluidic flowcells, such as may be provided by way of a glass plate having microfluidic flow channels etched therein. Such flowcells may be made as a laminated stack of layers, with the flow channels etched in one or more of the layers. In most flowcells, access to the flow channels within the flowcell may be provided by way of openings that pass through one or both of the outermost layers to reach the flow channels within.

Since it is difficult to decontaminate a flowcell after a sample has been flowed through it, it is common to replace the flowcell before analyzing a particular sample. As such, it is common for flowcells to be implemented using a cartridge-based approach to facilitate easy replacement of the flowcells.

SUMMARY

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale unless specifically indicated as being scaled drawings.

In some implementations, an apparatus is provided that includes a frame, a microfluidic plate having one or more first fluidic ports in a first side, and a first support bracket that is attached to the frame such that the microfluidic plate is interposed between the first support bracket and the frame, the first support bracket floats relative to the microfluidic plate and the frame, the microfluidic plate and the frame float relative to one another, and a first side of the first support bracket faces towards the microfluidic plate. In such implementations, the first support bracket may include a first indexing feature that protrudes from the first side of the first support bracket and is proximate to a first edge of the microfluidic plate and may also include a second indexing feature that protrudes from the first side of the first support bracket and is proximate to a second edge of the microfluidic plate. The first support bracket may include a first gasket with at least one seal that is proud of the first side of the first support bracket and is positioned against the first side of the microfluidic plate, and the first indexing feature of the first support bracket and the second indexing feature of the first support bracket may contact the first edge and the second edge, respectively, of the microfluidic plate when the at least one seal of the first gasket is aligned with a corresponding at least one of the one or more first fluidic ports.

In some such implementations, the microfluidic plate may have a second side opposite the first side, the frame may have a first overlapping portion that overlaps, when viewed along a direction perpendicular to a major surface of the microfluidic plate, a first portion of the microfluidic plate that includes the second edge, the first overlapping portion may be proximate to the second side of the microfluidic plate, the first overlapping portion may have a first clamp arm slot having a first slot width in a direction parallel to the second edge, the second side of the microfluidic plate may be visible, e.g., to the unaided eye, through the first clamp arm slot, the apparatus may be to, or configured to be, interfaced with a receiver of an analysis device, the receiver having a first clamp arm that is movable from an unclamped position in which the first clamp arm does not press on the second side of the microfluidic plate and does not engage with the first clamp arm slot to a clamped position in which the first clamp arm presses on the second side of the microfluidic plate and engages with the first clamp arm slot, and the first slot width may be larger than a width of the first clamp arm in a direction parallel to the second edge and located within the first clamp arm slot when the first clamp arm is in the clamped position.

In some such implementations of the apparatus, the microfluidic plate may have a third edge opposite the first edge and a fourth edge opposite the second edge, the frame may have a second overlapping portion that overlaps, when viewed along the direction perpendicular to the major surface of the microfluidic plate, a second portion of the microfluidic plate that includes the fourth edge, the second overlapping portion may be proximate to the second side of the microfluidic plate, and the second overlapping portion may have a second clamp arm slot having a second slot width in a direction parallel to the fourth edge, the second side of the microfluidic plate may be visible through the second clamp arm slot, the receiver of the analysis device within which the apparatus is to be, or configured to be, interfaced may have a second clamp arm that is movable from an unclamped position in which the second clamp arm does not press on the second side of the microfluidic plate and does not engage with the second clamp arm slot to a clamped position in which the second clamp arm presses on the second side of the microfluidic plate and engages with the second clamp arm slot, and the second slot width may be larger than a width of the second clamp arm in a direction parallel to the fourth edge and located within the second clamp arm slot when the second clamp arm is in the clamped position.

In some implementations of the apparatus, there may be two first fluidic ports in the microfluidic plate, and the first gasket may include two seals, each seal having a through-hole passing through the first support bracket and aligned with a different one of the first fluidic ports when the first indexing feature of the first support bracket and the second indexing feature of the first support bracket contact the first edge and the second edge, respectively, of the microfluidic plate.

In some such implementations, the first gasket may include a support foot that is proud of the first side of the first support bracket and is positioned against the microfluidic plate, a first axis may be defined between center points of the two seals of the first gasket, the support foot of the first gasket may be offset by a first amount from the first axis along a second axis perpendicular to the first axis and parallel to the microfluidic plate, and the support foot of the first gasket may have an upper surface that contacts the microfluidic plate and is co-planar with upper surfaces of the two seals of the first gasket that are also in contact with the microfluidic plate. In some further such implementations of the apparatus, the support foot of the first gasket may not serve as a seal.

In some implementations of the apparatus, the first gasket may be co-molded into the first support bracket.

In some implementations of the apparatus, the first support bracket may have a second side that faces away from the first side of the first support bracket, and at least two first fluidic port indexing features may protrude from the second side of the first support bracket, each first fluidic port indexing feature to, or configured to, engage with a corresponding fluidic port indexing hole on a first fluidic port block of an analysis device to, or configured to, receive the apparatus.

In some implementations of the apparatus, the frame may include two opposing first retaining clips with opposing surfaces that face one another, the first support bracket may be positioned in between the two opposing first retaining clips, the opposing surfaces of the first retaining clips may be spaced apart by a first distance, and the portion of the first support bracket between the opposing surfaces of the first retaining clips may have a first width in a direction spanning between the opposing surfaces of the first retaining clips that is less than the first distance.

In some implementations of the apparatus, the first support bracket may include a third indexing feature that protrudes from the first side of the first support bracket and is proximate to a third edge of the microfluidic plate opposite the first edge of the microfluidic plate, and the microfluidic plate may be interposed between the first indexing feature of the first support bracket and the third indexing feature of the first support bracket.

In some implementations of the apparatus, the microfluidic plate may be rectangular and the first edge of the microfluidic plate may be orthogonal to the second edge of the microfluidic plate and the second edge of the microfluidic plate may be orthogonal to the third edge of the microfluidic plate.

In some implementations of the apparatus, the frame may have a substantially rectangular opening, the microfluidic plate may sit within the substantially rectangular opening, the substantially rectangular opening may have opposing side walls that face towards one another, and the first indexing feature of the first support bracket may be interposed between one of the opposing side walls of the substantially rectangular opening and the first edge of the microfluidic plate and the third indexing feature of the first support bracket may be interposed between the other opposing side wall of the opposing side walls of the substantially rectangular opening and the third edge of the microfluidic plate.

In some implementations of the apparatus, the substantially rectangular opening may have an opening width in a direction parallel to the second edge, a first indexing feature width may exist between furthest-apart portions of the surfaces of the first indexing feature of the first support bracket and the third indexing feature of the first support bracket that face the opposing side walls of the substantially rectangular opening, and the opening width minus the first indexing feature width may be less than the first distance minus the first width.

In some implementations, the microfluidic plate may further include one or more second fluidic ports on the first side and the apparatus may further include a second support bracket that is attached to the frame such that the microfluidic plate is interposed between the second support bracket and the frame, the second support bracket floats relative to the microfluidic plate and the frame, the microfluidic plate and the frame float relative to one another, and a first side of the second support bracket faces towards the microfluidic plate. In such implementations, the second support bracket may include a first indexing feature that protrudes from the first side of the second support bracket and is proximate to the first edge of the microfluidic plate, the second support bracket may include a second indexing feature that protrudes from the first side of the second support bracket and is proximate to a fourth edge of the microfluidic plate opposite the second edge of the microfluidic plate, the microfluidic plate may be interposed between the second indexing feature of the first support bracket and the second indexing feature of the second support bracket, the second support bracket may include a second gasket with at least one seal that is proud of the first side of the second support bracket and is positioned against the microfluidic plate, and the first indexing feature of the second support bracket and the second indexing feature of the second support bracket may contact the first edge and the fourth edge, respectively, of the microfluidic plate when the at least one seal of the second gasket is aligned with a corresponding at least one of the one or more second fluidic ports.

In some such implementations, the frame may include two opposing second retaining clips with opposing surfaces that face one another, the second support bracket may be positioned in between the two opposing second retaining clips, the opposing surfaces of the second retaining clips may be spaced apart by a second distance, and the portion of the second support bracket between the opposing surfaces of the second retaining clips may have a second width in a direction spanning between the opposing surfaces of the second retaining clips that is less than the second distance.

In some further such implementations, the second support bracket may include a third indexing feature that protrudes from the first side of the second support bracket and is proximate to the third edge of the microfluidic plate, and the microfluidic plate may be interposed between the first indexing feature of the second support bracket and the third indexing feature of the second support bracket.

In some additional such implementations, the frame may have a substantially rectangular opening, the microfluidic plate may have a third edge opposite the first edge, the microfluidic plate may sit within the substantially rectangular opening, the substantially rectangular opening may have opposing side walls that face towards one another and that define an opening width in a direction parallel to the second edge, the first indexing feature of the second support bracket may be interposed between one of the opposing side walls of the substantially rectangular opening and the first edge of the microfluidic plate and the third indexing feature of the second support bracket may be interposed between the other opposing side wall of the opposing side walls of the substantially rectangular opening and the third edge of the microfluidic plate, the microfluidic plate may have a plate width in a direction spanning between the first indexing feature of the second support bracket and the third indexing feature of the second support bracket, a second indexing feature width may exist between furthest-apart portions of the surfaces of the first indexing feature of the second support bracket and the third indexing feature of the second support bracket that face the opposing side walls of the substantially rectangular opening, and the opening width minus the second indexing feature width may be less than the second distance minus the second width.

In some implementations, there may be two second fluidic ports in the microfluidic plate, and the second gasket may include two seals, each seal having a through-hole passing through the second support bracket and aligned with a different one of the second fluidic ports when the first indexing feature of the second support bracket and the second indexing feature of the second support bracket contact the first edge and the fourth edge, respectively, of the microfluidic plate.

In some implementations, the second gasket may include a support foot that is proud of the first side of the second support bracket and is positioned against the microfluidic plate, a third axis may be defined between center points of the two seals of the second gasket, the support foot of the second gasket may be offset by a second amount from the third axis along a fourth axis perpendicular to the third axis and parallel to the microfluidic plate, and the support foot of the second gasket may have an upper surface that contacts the microfluidic plate and may be co-planar with upper surfaces of the two seals of the second gasket that are also in contact with the microfluidic plate. In some such implementations, the support foot of the second gasket may not serve as a seal. In some alternative or additional such implementations, the second gasket may be co-molded into the second support bracket.

In some implementations, the second support bracket may have a second side that faces away from the first side of the second support bracket, and at least two second fluidic port indexing features may protrude from the second side of the first support bracket, each first fluidic port indexing feature to, or configured to, engage with a corresponding fluidic port indexing hole on a first fluidic port block of an analysis device to, or configured to, receive the apparatus.

These and other implementations are described in further detail with reference to the Figures and the detailed description below. Other features, aspects, and advantages will become apparent from the description, the drawings, and the claims. Note that the relative dimensions of the following figures may not be drawn to scale.

BRIEF DESCRIPTION OF THE DRAWINGS

The various implementations disclosed herein are illustrated by way of example, and not by way of limitation, in the figures of the accompanying drawings, in which like reference numerals refer to similar elements.

FIGS. 1 through 4 and 9 through 13 are drawn to scale within each Figure, although the scale of the depicted embodiments may vary from Figure to Figure.

DETAILED DESCRIPTION

The present inventors have conceived of new designs for a flowcell cartridge, such as may be used in chemical and biological analysis systems that utilize microfluidic flow structures contained within a glass plate structure. These concepts are discussed herein with respect to the following Figures, although it will be appreciated that these concepts may be implemented in cartridge designs other than the specific example shown, and that such other implementations would still potentially fall within the scope of the claims.

Figure 1:
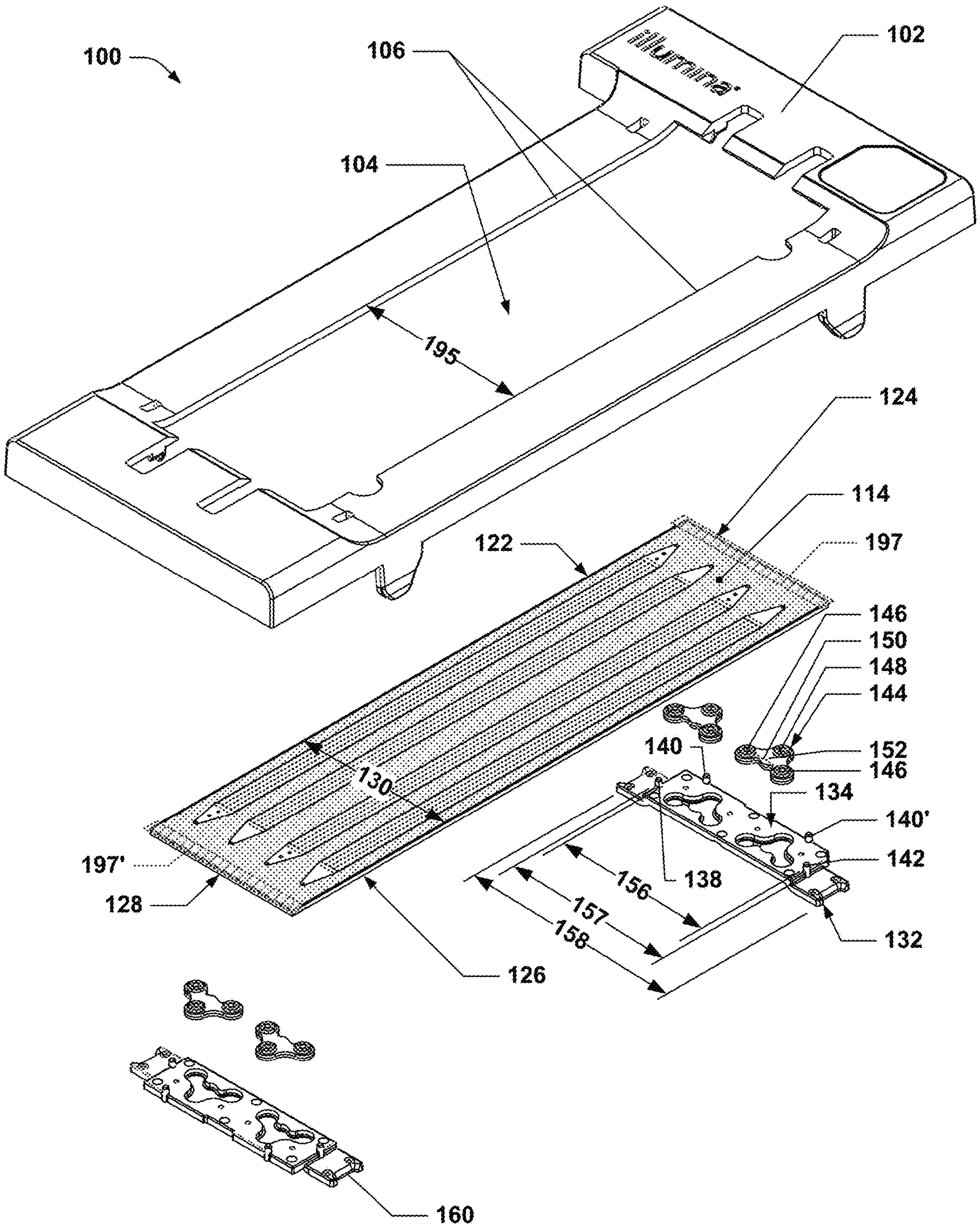
FIG. 1 depicts an exploded isometric view of an example flowcell cartridge.
Figure 2:
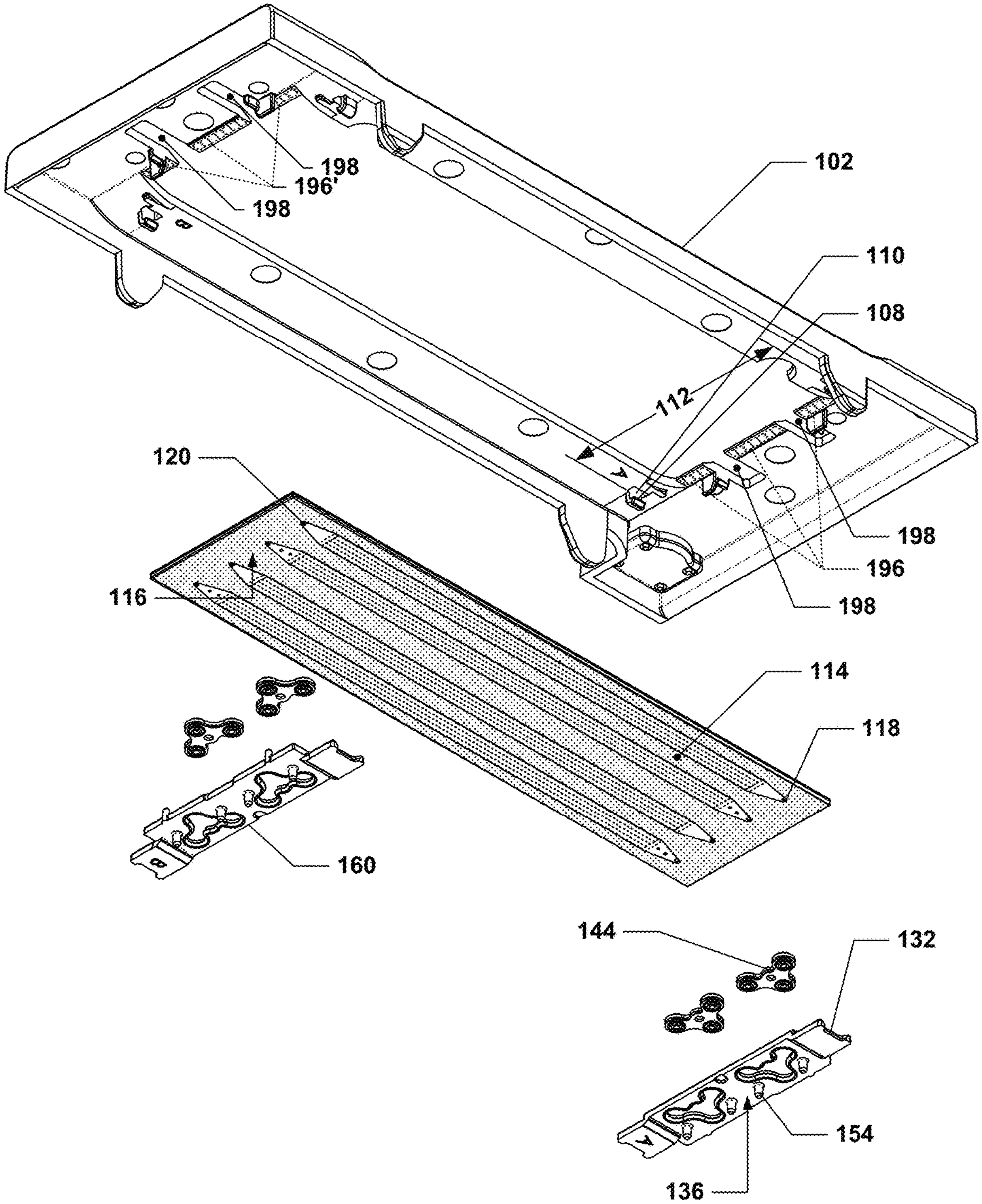
FIG. 2 depicts an exploded underside isometric view of the example flowcell cartridge of FIG. 1.

FIG. 1 depicts an exploded isometric view of an example flowcell cartridge. In FIG. 1, the flowcell cartridge 100 has a frame 102 that may, for example, be made of molded plastic or other, durable material. The frame may provide a support structure for supporting a glass plate (or a plate of other material, e.g., acrylic or other plastic), such as glass plate 114 that contains microfluidic flow structures; this plate may also be referred to herein as a microfluidic plate. In this example, the glass plate, which has a first edge 122, a second edge 124, a third edge 126, and a fourth edge 128, includes four sets of multiple, parallel microfluidic flow channels that extend along directions parallel to the long axis of the glass plate, e.g., along axes that are parallel to the first edge 122 and/or the third edge 126. To the extent applicable, the terms "first," "second," "third," etc. (or other ordinal indicators) herein are merely employed to show the respective objects described by these terms as separate entities and are not meant to connote a sense of chronological order, unless stated explicitly otherwise herein. The first edge 122 and the third edge 126 may be generally orthogonal to the second edge 124 and the fourth edge 128 in some implementations, but may be other orientations in other implementations. As can be seen in FIG. 2, which depicts an exploded underside isometric view of the example flowcell cartridge of FIG. 1, each set of microfluidic flow structures may terminate in one or more first fluidic ports 118 and one or more second fluidic ports 120. The first and second fluidic ports 118 and 120 may be located in a first side 116 of the glass plate 114, although other implementations may only include the first fluidic ports 118 or the second fluidic ports 120 on the first side 116. The frame 102 may have a substantially rectangular opening (or opening of another shape) 104 that is sized to receive the glass plate 114; the rectangular opening 104 may include opposing side walls 106 that are in close proximity to the first edge 122 and the third edge 126 of the glass plate 114 when the cartridge is fully assembled. As used herein, the term "substantially rectangular" is use to refer to an opening that has an overall rectangular shape, although there may be various features or discontinuities in the overall shape, such as the semi-circular notches along one side wall of the depicted rectangular opening, or the clamp arm slots along the short edges of the rectangular opening 104. The opposing side walls 106 may be spaced apart by an opening width 195 to allow the first support bracket 132 and the second support bracket 160, and thus the glass plate 114, to float within the rectangular opening 104 for at least some range of movement, e.g., about 1 mm to about 2 mm or less.

The glass plate 114 may be held in place in the cartridge 100 through the use of one or more support brackets, such as a first support bracket 132 and a second support bracket 160. In this discussion, only the features of the first support bracket 132 are discussed in detail, although it is readily apparent from the Figures that the second support bracket 160, which may or may not be identical to the first support bracket 132, is at least structurally similar to the first support bracket 132 and may operate in a similar manner.

The first support bracket 132 may have a first side 134 (see FIG. 1) and a second side 136 (see FIG. 2). The first side 134 may face towards the glass plate 114 and may have a first indexing feature 138, e.g., a molded pin or post, that extends away from the first side 134 and that is at least long enough that the side of the first indexing feature 138 that faces towards the glass plate 114 may contact the glass plate 114 when the cartridge is fully assembled. The first indexing feature 138 may be positioned on the first support bracket 132 such that the first indexing feature 138 is proximate to, or contacting, the first edge 122 of the glass plate 114 when the cartridge is fully assembled. The first support bracket 132 may also have one or more second indexing features 140 (an additional second indexing feature 140' is also shown in FIG. 1) that may be similar to the first indexing feature 138 except that each second indexing feature 140 may be positioned on the first support bracket 132 such that the second indexing feature 140 is proximate to, or physically contacts, the second edge 124 of the glass plate 114. The first support bracket 132 may also include a third indexing feature 142, which may be positioned on an opposite end of the first support bracket 132 from the first indexing feature 138. The first indexing feature 138 and the third indexing feature 142, if used, may be separated from one another by a first float gap 156, which may be sized to be slightly larger than the plate width 130 so as to allow the glass plate 114 to "float" within the confines of the first indexing feature 138 and the third indexing feature 142. The furthest-apart surfaces of the first indexing feature 138 and the third indexing feature 142 may similarly define a first indexing feature width 157. The opening width 195 may be wider than the first indexing feature width 157 so that the first support bracket 132 may float laterally between the opposing side walls 106 of the rectangular opening 104.

The first support bracket may also include one or more first gaskets 144, which may include one or more seals 146 (each first gasket 144, in this example, includes two seals 146, each positioned so as to interface with a different first fluidic port 118). The first gaskets 144 may, for example, be insertable into the first support bracket 132 or may, in some implementations, be co-molded with the first support bracket 132 (in the latter case, the first gaskets 144 and the first support bracket 132 may, in effect, be treated as a single component). The seals may be proud of the first side 134 and, optionally, the second side 136 of the first support bracket so that they may compress against the glass plate 114 and, as discussed later herein, a fluidic port block, respectively. In some implementations, the seal may not be proud of the second side 136 of the first support bracket, e.g., if the fluidic port block that faces the second side 136 when the cartridge is installed in an analysis device has a raised boss that may engage with the seal.

The first gasket 144 may also include a support foot 148, which may be provided to prevent or mitigate "rolling" of the first gasket 144 about an axis passing through the centers of the seals 146 when the first support bracket 132 is translated in a direction parallel to the major surface of the glass plate 114 while the seals 146 are in contact with the glass plate 114. To this end, the support foot 148 may be offset from a first axis 150 spanning between the centers of the seals 146 of the first gasket 144 along a second axis 152 perpendicular to the first axis 150 by some amount so as to provide a moment arm to resist such rolling behavior. The support foot 148 and the seals 146 may all be designed to have contact surfaces that contact the glass plate 114 in concert when the glass plate 114 is brought into contact with the first gasket 144. These contact surfaces may all be parallel to one another to ensure that when the contact surface of the support foot 148 is in contact with the glass plate 114, the contact surface(s) of the seal(s) 146 are also in good, i.e., not having any misalignment gaps, contact with the glass plate 114. In the example cartridge shown, each support bracket includes two first gaskets, although they may be referred to as second gaskets, third gaskets, etc., in the interests of reducing confusion, if needed. It is also be understood that the support foot 148, while appearing similar to the seals 146, may actually not provide any "sealing" characteristics at all—it may be present solely for the purposes of preventing or mitigating "rolling."

Figure 5:
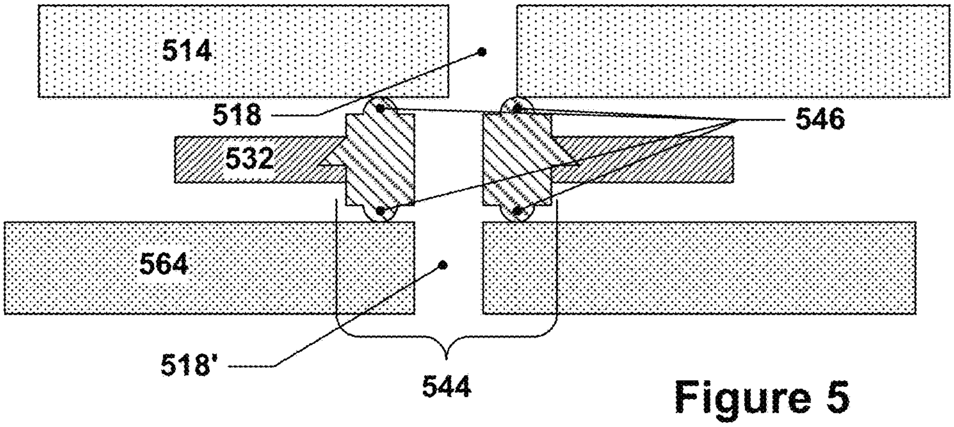
FIGS. 5 and 6 are diagrams illustrating how a seal can roll when the surfaces between which the seal is interposed are translated laterally.
Figure 6:
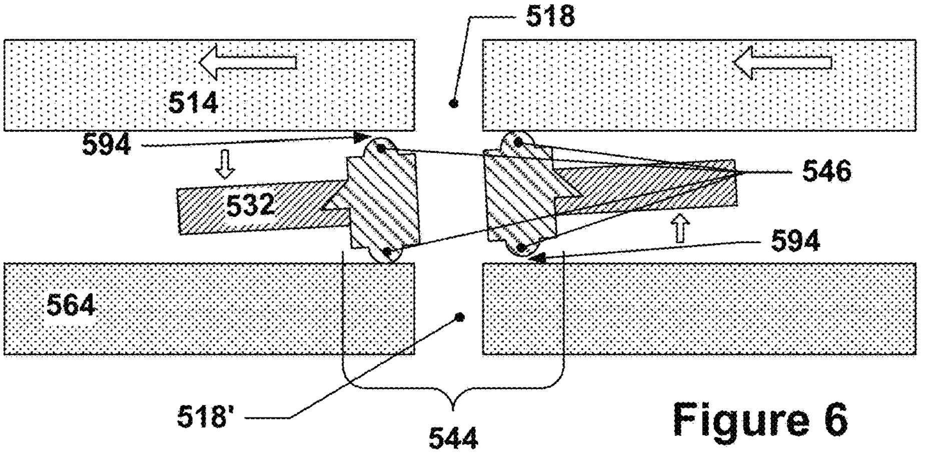

FIGS. 5 and 6 are diagrams illustrating how a seal can roll when the surfaces between which the seal is interposed are translated laterally. In FIG. 5, a glass plate 514 is offset from a fluidic port block 564, and a support bracket 532 with a gasket 544 is interposed between them. The gasket 544 has a seal 546 that is aligned with a fluidic port 518' in the fluidic port block 564, but that is misaligned somewhat with a fluidic port 518 in the glass plate 514. As can be seen in FIG. 6, when the glass plate 514 is slid sideways so that the fluidic port 518 is aligned with the seal 546, friction between the seal 546 and the glass plate 514/fluidic port block 564 may cause the seal 546 to not slide a commensurate distance—as a result, the gasket 544 and the support bracket 532 may tilt or roll slightly, resulting in gaps 594 appearing between the seal 546 and the glass plate 514/fluidic port block 564. This is, of course, undesirable, as it causes leakage.

Figure 7:
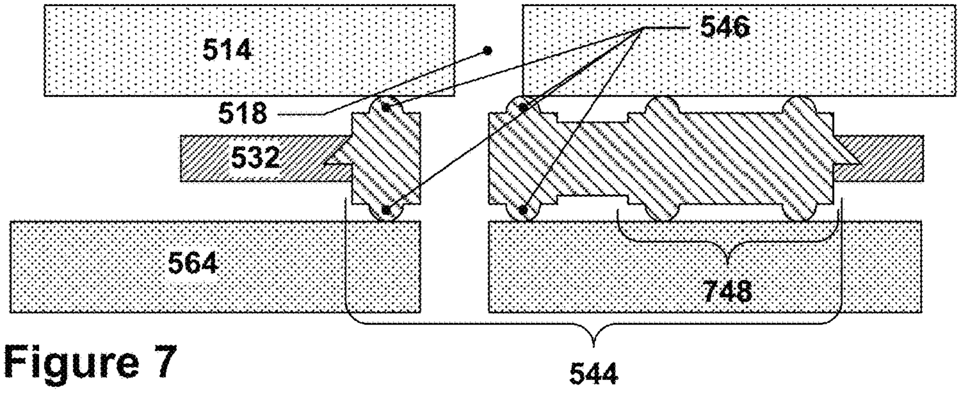
FIGS. 7 and 8 are diagrams illustrating how a gasket with a support foot can prevent the rolling behavior illustrated in FIGS. 5 and 6.
Figure 8:
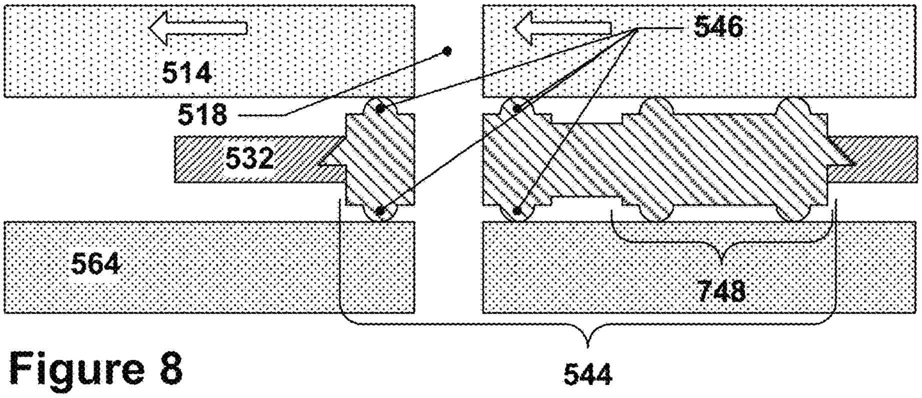

FIGS. 7 and 8 are diagrams illustrating how a gasket with a support foot can prevent the rolling behavior illustrated in FIGS. 5 and 6. As can be seen, the gasket 544 has been extended to the right and a support foot 748 has been added to the gasket 544. When the glass plate 514 is slid to the left, as in FIG. 6, the support foot 748 introduces a counter-moment to any potential rolling moment caused by friction between the seal 546 and the glass plate 514/fluidic port block 564. This prevents the formation of the gaps 594 and keeps the seal 546 in good contact with the surfaces it seals.

The first support bracket 132 may snap into two opposing first retaining clips 108 (only one is visible in FIG. 2, as the other is obscured by other features of the frame 102—however, there are corresponding second retaining clips visible on the opposite end of the frame 102 that are configured similarly but at a different location). The first retaining clips 108 may have opposing surfaces 110 that are separated from one another by a first distance 112. The first distance may be greater than a first width 158 of the first support bracket 132, thereby allowing the first support bracket 132 to float laterally by a small amount when snapped into the first retaining clips 108. In some implementations, the amount of float between the first support bracket 132 and the opposing side walls 106, i.e., the opening width 195 minus the first indexing feature width 157, may be smaller than the amount of float between the first support bracket 132 and the retaining clips 108, i.e., the first distance 112 minus the first width 158. Similar relationships may exist for the second support bracket 160.

Figure 3:
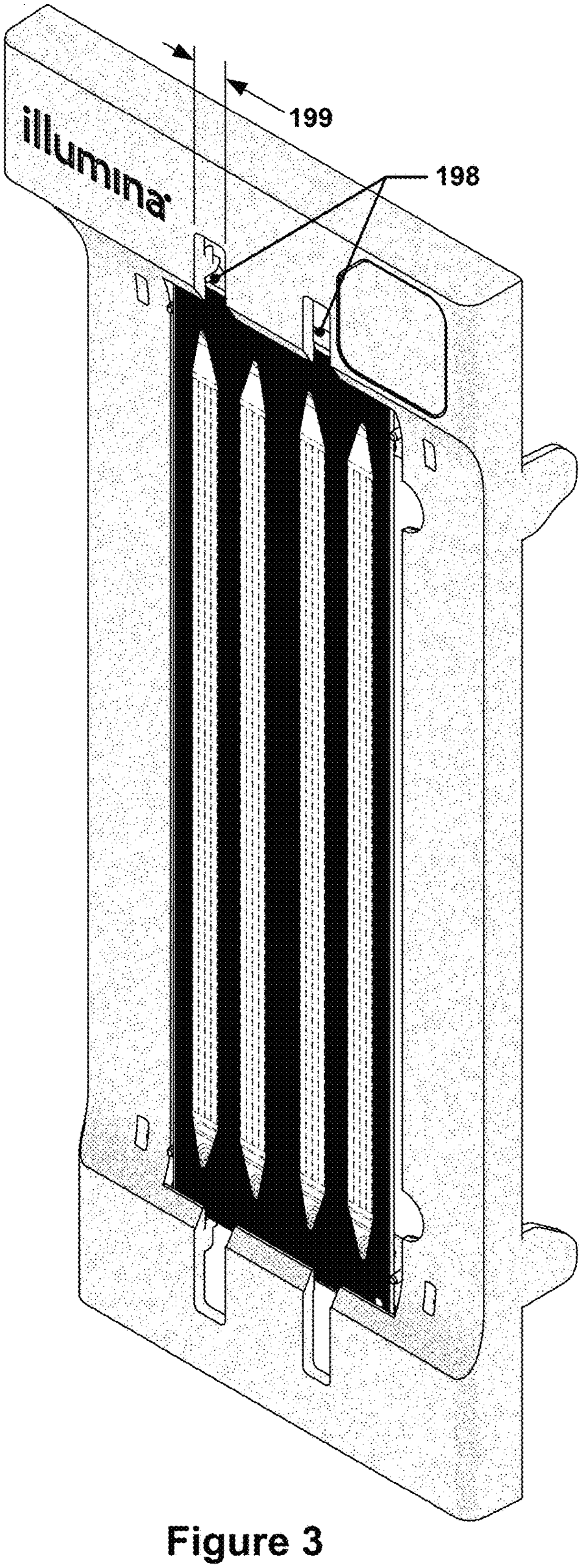
FIG. 3 depicts a front isometric view of the example flowcell cartridge of FIG. 1 in an unexploded state.
Figure 4:
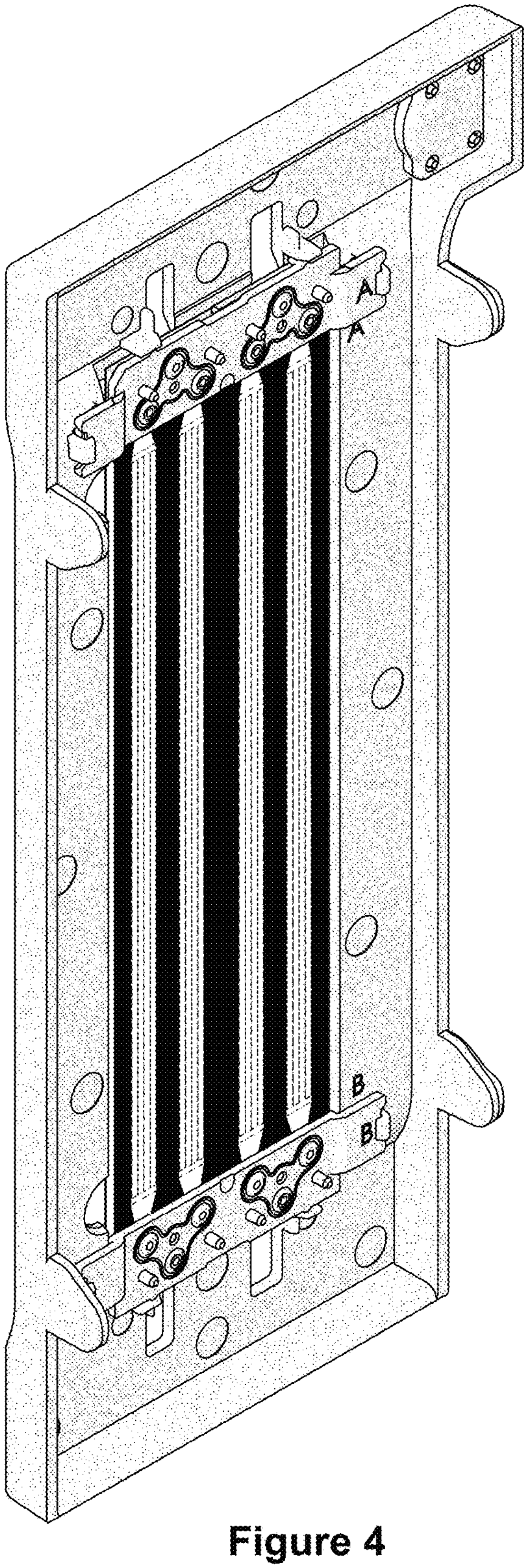
FIG. 4 depicts a rear isometric view of the example flowcell cartridge of FIG. 1 in an unexploded state.

FIG. 3 depicts a front isometric view of the example flowcell cartridge of FIG. 1 in an unexploded/assembled state. FIG. 4 depicts a rear isometric view of the example flowcell cartridge of FIG. 1 in an unexploded/assembled state. As can be seen, the glass plate 114 is held in place within the frame 102 by the first support bracket 132 and the second support bracket 160, which, in turn, are held in place by the first retaining clips 108 and second retaining clips, respectively. The frame may have a first overlapping portion 196 and a second overlapping portion 196' (see FIG. 2) that overlap with a corresponding first portion 197 and second portion 197' (see FIG. 1) of the glass plate 114. The first portion 197 may include the second edge 124, and the second portion 197' may include the fourth edge 128. The overlapping portions 196/196' may prevent the glass plate 114 from falling out of the front of the frame 102, e.g., the glass plate 114 may be sandwiched between the overlapping portions 196/196' and the first/second support brackets 132/160. The glass plate 114 may still, however, be free to float within the frame to some degree.

Figure 9:
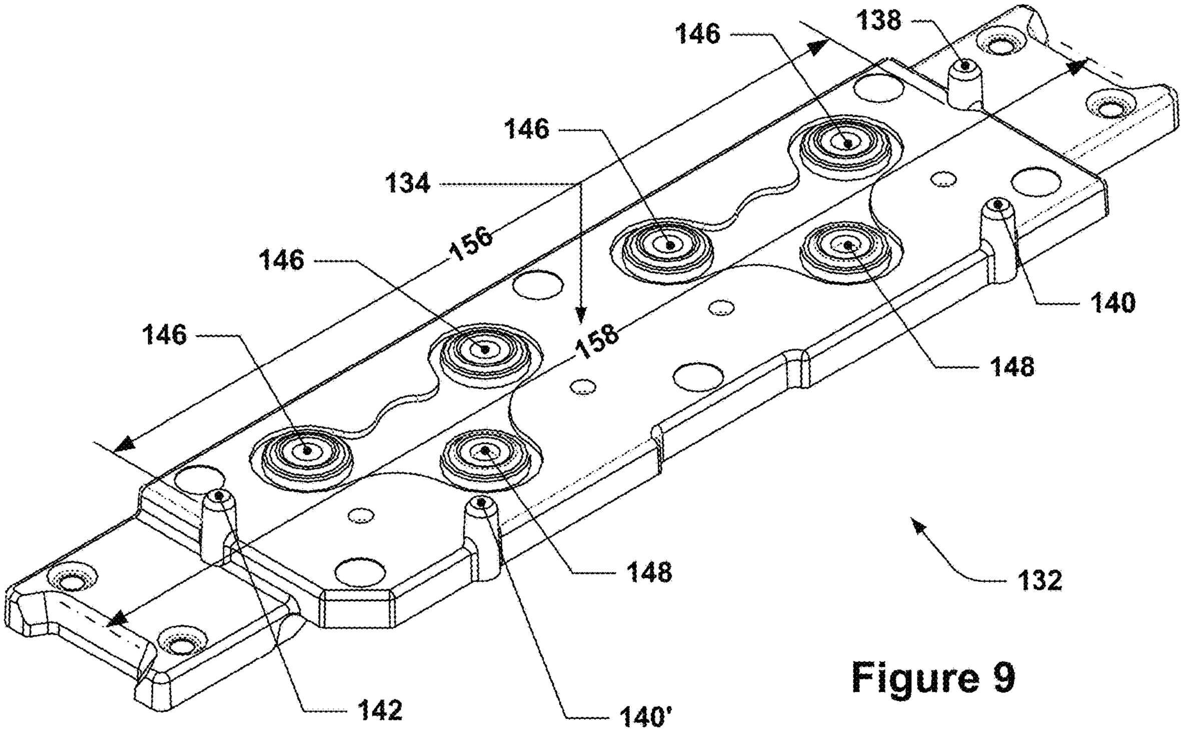
FIG. 9 depicts an isometric view of a floating support bracket of the example flowcell cartridge of FIG. 1.
Figure 10:
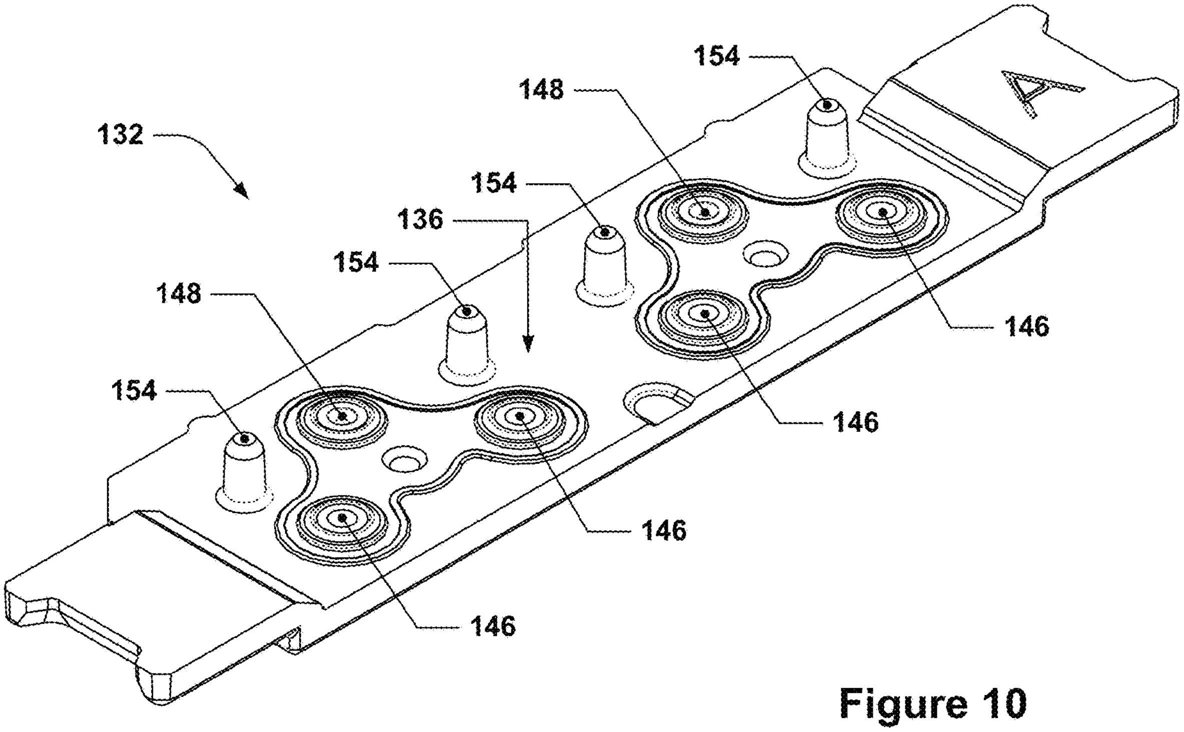
FIG. 10 depicts an underside isometric view of the floating support bracket of the example flowcell cartridge of FIG. 1.

FIG. 9 depicts an isometric view of the first support bracket 132 of the example flowcell cartridge 100 of FIG. 1. FIG. 10 depicts an underside isometric view of the first support bracket 132 of the example flowcell cartridge 100 of FIG. 1. In addition to the first indexing feature 138, the second indexing feature(s) 140, and possibly the third indexing feature 142, the first support bracket 132 may also include first fluidic port indexing features 154 on the second side 136 of the first support bracket 132 (the second support bracket 160 may have corresponding second fluidic port indexing features as well). As can be seen, the first support bracket has portions that extend beyond the first width 158, e.g., the small "teeth" that are located at the four outermost corners of the first support bracket 132. These teeth may engage with the first retaining clips 108 and may allow the first support bracket 132 to also float along an axis parallel to the first edge 122 by some limited amount.

In this example cartridge, the glass plate 114 may float with respect to the support brackets 132 and 160, and the support brackets 132 and 160, in turn, may float with respect to the frame 102. Thus, there are two tiers of floating components in the example cartridge. The combination of these different tiers of floating components, as well as the various indexing features provided, allow for the glass plate 114 and the seals 146 to be properly aligned with each other and with ports on floating manifold blocks located on equipment that receives the cartridge 100.

Figure 11:
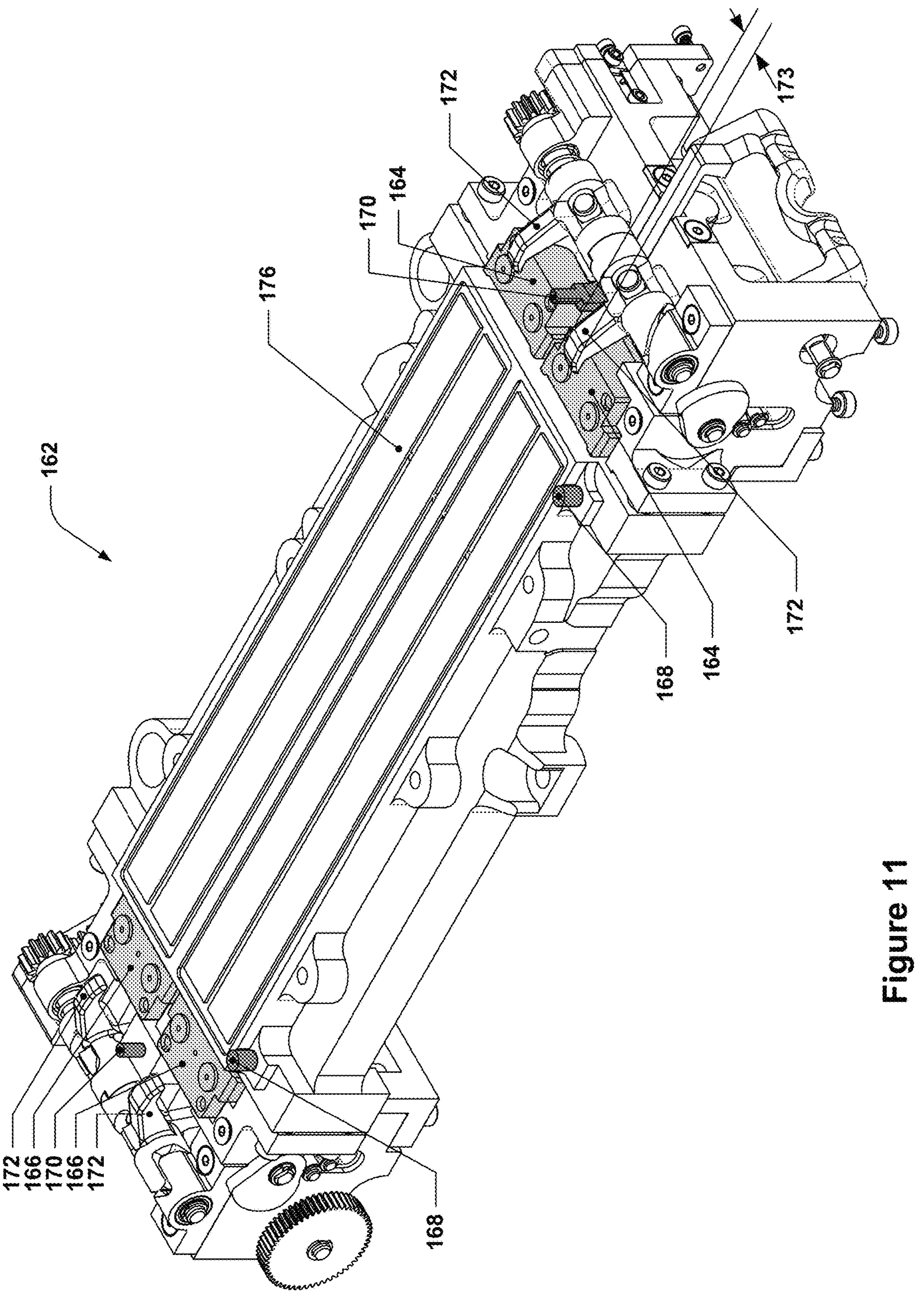
FIG. 11 depicts an isometric view of an example receiver for the example flowcell cartridge of FIG. 1.

FIG. 11 depicts an isometric view of an example receiver for the example flowcell cartridge of FIG. 1. As seen in FIG. 11, a receiver 162 may be provided; the receiver may be a subcomponent of a larger analysis device that utilizes the cartridge 100. The receiver 162 may include a chuck 176, against which the glass plate 114 may be drawn, e.g., by a vacuum, during analysis operations. The receiver 162, in this example, may include a pair of first fluidic port blocks 164 and an opposing pair of second fluidic port blocks 166. The first fluidic port blocks 164 and the second fluidic port blocks 166 may be configured to float slightly in directions at least parallel to the upper surface of the chuck 176 (and possibly also in directions perpendicular to the upper surface of the chuck 176). The ends of the receiver 162 may include, for example, a clamping mechanism that may serve to clamp the glass plate 114 against the chuck 176. Such clamping mechanisms may, for example, have clamp arms 172 that may rotate downwards and contact the upper surface of the glass plate 114 of the cartridge 100 when the cartridge 100 is installed. The receiver 162 may also include indexing features that are located so as to engage with the support brackets and glass plate 114 of the cartridge 100 when the cartridge 100 is installed. For example, lateral indexing pins 168 may be placed such that the glass plate 114 contacts the lateral indexing pins 168 when the glass plate 114 is translated laterally along the short axis of the chuck 176, and longitudinal indexing pins 170 may be positioned so as to contact the support brackets of the cartridge 100 when, for example, one of the longitudinal indexing pins 170 is moved towards the other longitudinal indexing pins 170. In this example, the longitudinal indexing pin 170 on the left is fixed in space relative to the receiver 162, whereas the other longitudinal indexing pin 170 is configured to slide along an axis parallel to the long axis of the chuck 176. The sliding longitudinal indexing pin 170 may be sprung so as to be biased towards the other longitudinal indexing pin 170. The interaction of the various indexing features is explained in more detail below, with respect to FIG. 12.

Figure 12:
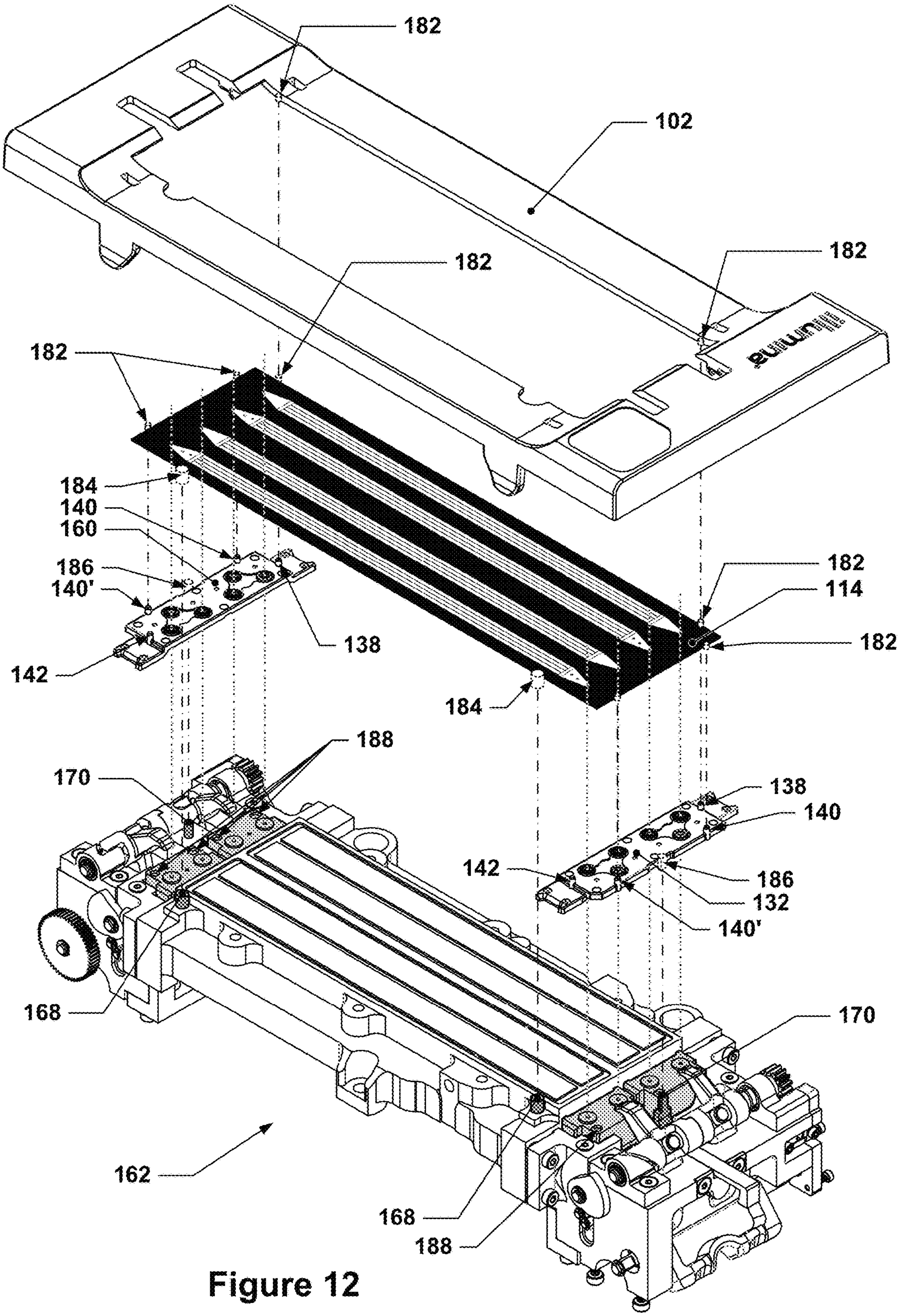
FIG. 12 depicts an exploded isometric view of the example receive of FIG. 11 and the example flowcell cartridge of FIG. 1.

FIG. 12 depicts an exploded isometric view of the example receiver of FIG. 11 and the example flowcell cartridge of FIG. 1. In this example, the cartridge 100 has been shown in an exploded view, although the various components that form the cartridge would be fully assembled, per FIG. 3, prior to the cartridge 100 being placed in the receiver 162.

When the cartridge 100 is laid on top of the receiver 162, the clamp arms 172 may rotate downward and engage with the top side of the glass plate 114. The clamp arms 172 may also, as they pivot, translate along their rotational axes towards the lateral indexing pins 168 such that the sides of the clamp arms 172 engage with the sides of the rectangular notches or clamp arm slots 198, thereby causing the entire frame 102 to translate along the same axis as well. For example, the clamp arm slots 198 may be sized, e.g., with clamp arm widths 173 in a direction parallel to the second edge 124 that are less than the widths of the clamp arm slots 198 in the same direction, to allow the clamp arms 172 to swing through the clamp arm slots 198 freely and, during lateral translation of the clamp arms 172, press against the sides of the clamp arm slots 198 facing away from the lateral indexing pins 168, thereby pushing the frame 102 towards the lateral indexing pins 168. During this lateral sliding motion, the frame 102 will (if not already in such a state) come into contact with the first indexing feature 138 on the first support bracket 132 (and a corresponding first indexing feature on the second support bracket 160) at indexing feature contact points 182 located along one of the opposing side walls 106. As the frame 102 continues to be translated towards the lateral indexing pins 168, the glass plate 114 will eventually come into contact with both the lateral indexing pins 168 and the first indexing features 138 (see lateral indexing pin contact points 184 and the indexing feature contact points 182 along the first edge 122 of the glass plate 114). Eventually, the first indexing features 138 will be sandwiched between the frame 102 and the glass plate 114 (which is pressed against the lateral indexing pins 168), thereby locating the first support bracket 132 and the second support bracket 160 firmly in space in the lateral direction, i.e., perpendicular to the long axis of the chuck 176. This aligns the seals on the first support bracket 132 and the second support bracket 160 with the corresponding first fluidic ports 118 and the corresponding second fluidic ports 120, respectively, on the glass plate 114.

Subsequent to, after, or in concert with the translation of the frame 102 towards the lateral indexing pins 168, the longitudinal indexing pins 170 may be caused to move towards one another (one or both may move), thereby contacting the facing edges of the first support bracket 132 and the second support bracket 160 and pushing the first support bracket ##32 and the second support bracket 160 towards one another. As the first support bracket ##32 and the second support bracket 160 move towards one another, the glass plate 114 may come into contact with the second indexing features 140 (and 140', if present) on the first support bracket 132 and the second support bracket 160. The first support bracket 132 and the second support bracket 160 may thus become aligned with the glass plate 114 and, consequently, the first fluidic ports 118 and the second fluidic ports 120.

After or during such plate alignment, the fluidic port blocks 164, 166 may be raised so that the first fluidic port indexing features 154 (and corresponding second fluidic port indexing features on the second support bracket 160) may be inserted into corresponding alignment holes 188 on the first fluidic port block 164 and the second fluidic port block 166. As the fluidic port block rises, the first fluidic port indexing features 154 and the second fluidic port indexing features may engage with the corresponding alignment holes 188 and force the first fluidic port blocks 164 and the second fluidic port blocks 166 into alignment with the first support bracket 132 and the second support bracket 160, respectively. This, in turn, ensures that the corresponding seals 146 on the respective support brackets 132, 160 line up with the fluidic ports on the first fluidic port blocks 164 and the second fluidic port blocks 166, respectively.

Thus, the cartridge 100 may have multiple levels of floating components that engage with different sets of indexing features/pins in the cartridge 100 and located on the receiver 162 and are moved into precisely aligned positions that cause the fluidic ports, seals, and port block ports to line up, e.g., such that the centerlines of the fluidic ports, seals, and port block ports are, in some implementations, within less than about 0.05 mm of one another, thereby ensuring a high-quality liquid-tight seal. At the same time, some implementations of the cartridge may feature additional features in the floating brackets, e.g., support feet, that may prevent rolling behavior of the seal, thereby ensuring the integrity of any sealed connections. Some of the floating components, e.g., the support brackets, may also act to retain other floating components, e.g., the glass plate, in a manner that prevents stressing the glass plate due to thermal expansion mismatches between the glass plate and the cartridge frame, minor flexure of the cartridge frame, and so forth.

Figure 13:
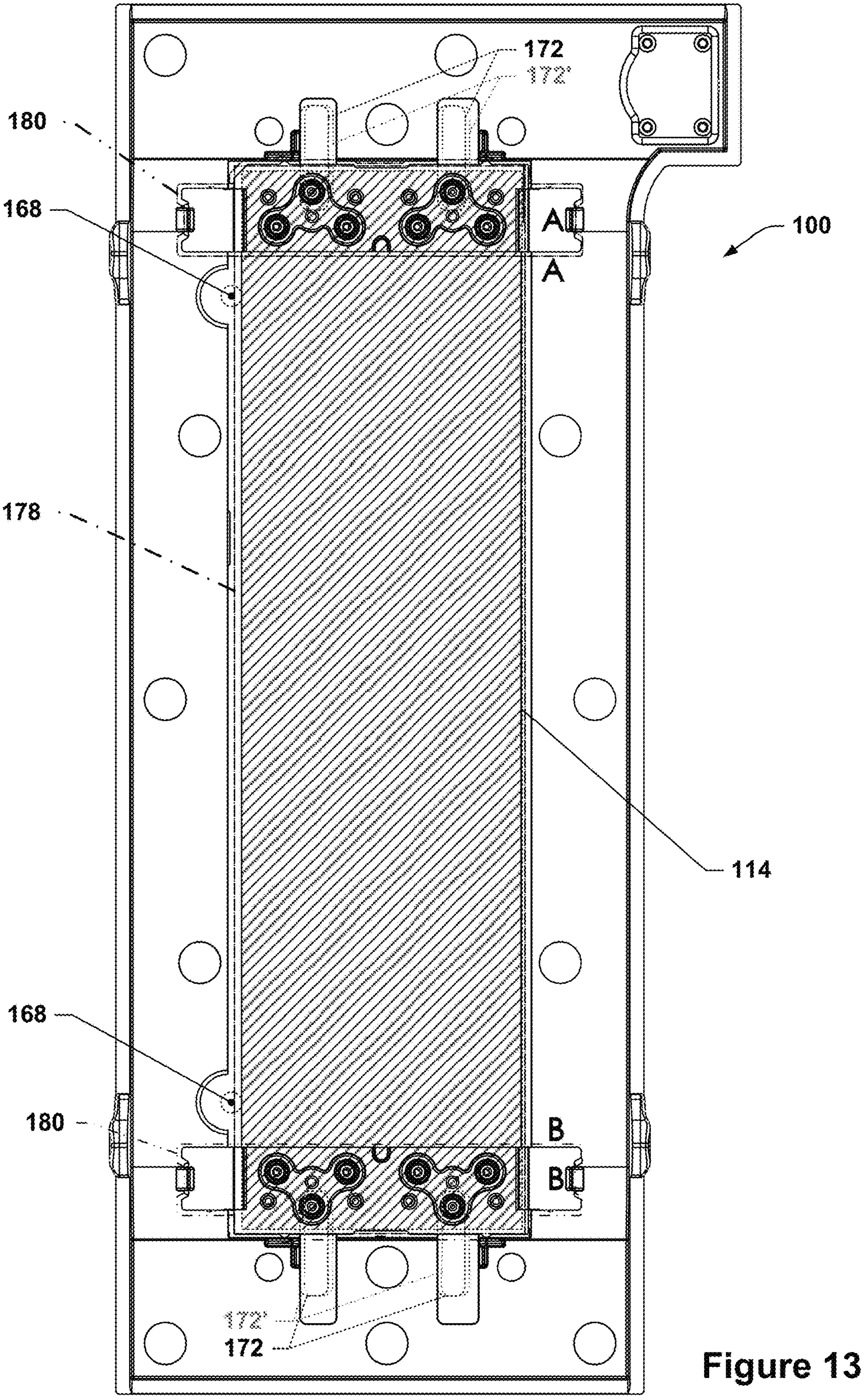
FIG. 13 depicts a plan view of the example flowcell cartridge of FIG. 1.

The floating behavior of the various components in the cartridge 100 may be better understood with reference to FIG. 13, which depicts a plan view of the example flowcell cartridge of FIG. 1. For reference purposes, the lateral indexing pins 168 are shown as dotted circles and the outlines of the clamp arms 172 are shown as dotted, rounded rectangles, but the remainder of the components shown are part of the cartridge 100. The clamp arms 172 are shown in both an "engaged" position (black line font) in which they are engaged with and pressed against the sides of the clamp arm slots 198 (see FIG. 2) and a non-engaged position (grey line font), which may be their position prior to translating laterally. The glass plate 114 maybe able to move laterally by an amount relative to the frame 102 that is limited by the first and second indexing features 138 and 142, respectively 11. The first and second support brackets may be able to move laterally (as well as longitudinally) by a lesser amount, as is shown by the bracket float envelopes 180. For example, the first and second support brackets may be able to float laterally by a distance of X, which may be the opening width 195 minus the first indexing feature width 157, relative to the frame, and the glass plate 114 may be able to float laterally by a distance of Y, which may be the first float gap 156 minus the plate width 130, relative to the first and second support brackets 132 and 160. In some such implementations, Y may be less than X-however, the glass plate 114 may still float by a larger amount relative to the frame 102 than the first and second support brackets 132 and 160 since the glass plate 114 has a total overall float relative to the frame 102 of X+Y. This may allow for considerable adjustment in the positioning of the glass plate.

Figure 14:
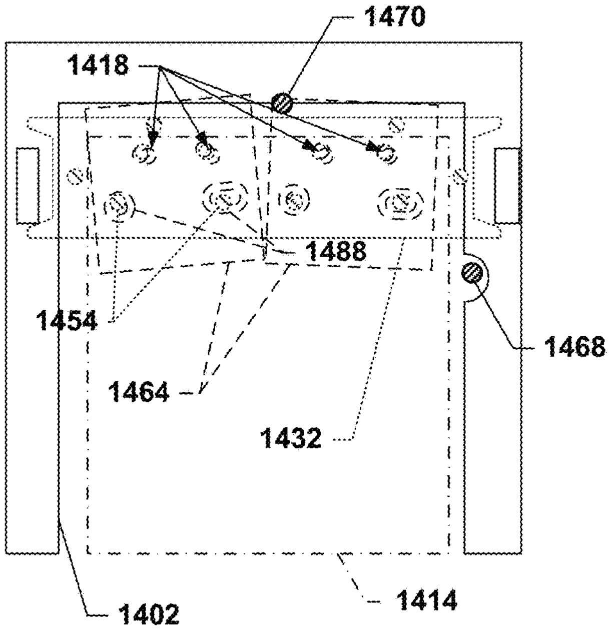
FIGS. 14 through 17 depict various stages of component alignment that may occur during clamping of an example flowcell cartridge.

An example alignment sequence is reviewed in FIGS. 14 through 17, which depict various stages of component alignment that may occur during clamping of an example flowcell cartridge. In FIG. 14, the frame 1402 (shown in solid lines) of a flowcell cartridge is lowered onto a receiver with two floating fluidic port blocks 1464 (shown in dashed lines). As can be seen, the fluidic port blocks 1464 are slightly askew due to the fact that both are "floating." Also visible in FIG. 14 is the outline of a support bracket 1432 (dotted lines) and a glass plate 1414 (dash-dot-dash lines). There are four instances of fluidic ports 1418 across the glass plate 1414. As can be seen, at each fluidic port 1418, there are corresponding features belonging to the support bracket (dotted circles) and fluidic port blocks (dashed lines). These correspond, for example, to the holes in the seals 146 and to the ports in the fluidic port blocks 1464. As is evident, there is some alignment between these three separate fluidic flow features at each location, but the alignment is far from ideal, resulting in differently-configured apertures at each location which may cause imbalances in fluid flow.

Figure 15:
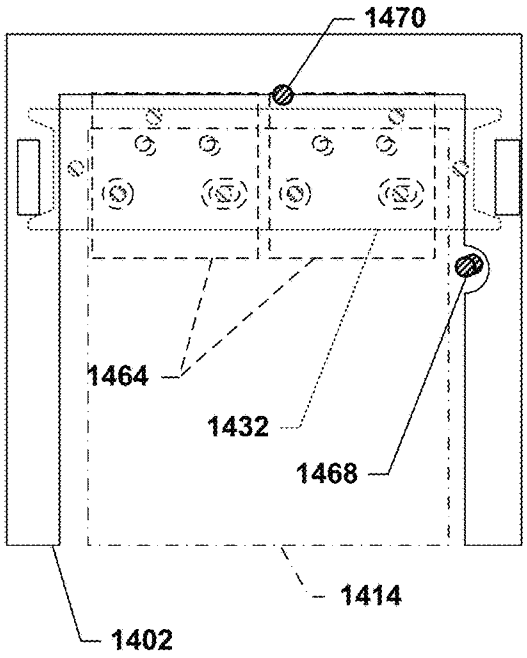

In FIG. 15, the support bracket 1432 has been fully engaged with the fluidic port blocks 1464 so that fluidic port indexing features 1454 (see FIG. 14) are fully inserted into alignment holes 1488 (also see FIG. 14). The alignment holes 1488, for example, may be countersunk and the fluidic port indexing features 1454 may have conical or rounded tips so that they may engage with one another even if somewhat misaligned; as the fluidic port indexing features 1454 are more fully engaged with the alignment holes 1488, the countersink portion may narrow and force the fluidic port indexing features 1454 to move towards the center of the alignment holes 1488. As can be seen, one of the alignment holes 1488 for a given fluidic port block 1464 may be circular, thereby providing both X and Y location constraints, whereas the other may be obround to provide a single degree of constraint, e.g., along only the Y axis, as this may be all that is needed in one implementation to prevent rotation about the other alignment hole 1488. It is to be recognized that the alignment holes 1488 and the fluidic port indexing features 1454 may also be swapped, i.e., the alignment holes 1488 may be located on the support bracket 1432, and the fluidic port indexing features 1454 may be located on the fluidic port block 1464.

Returning to FIG. 15, the interfacing of the cartridge with the fluidic support blocks 1464 causes the fluidic port blocks 1464 to come into alignment with each other as well as with the support bracket 1432. Consequently, the ports on the fluidic port blocks 1464 are now precisely aligned with the holes, e.g., the seals, on the support bracket 1432. However, the holes/seals on the support bracket 1432 are not yet aligned with the fluidic ports 1418 on the glass plate.

Figure 16:
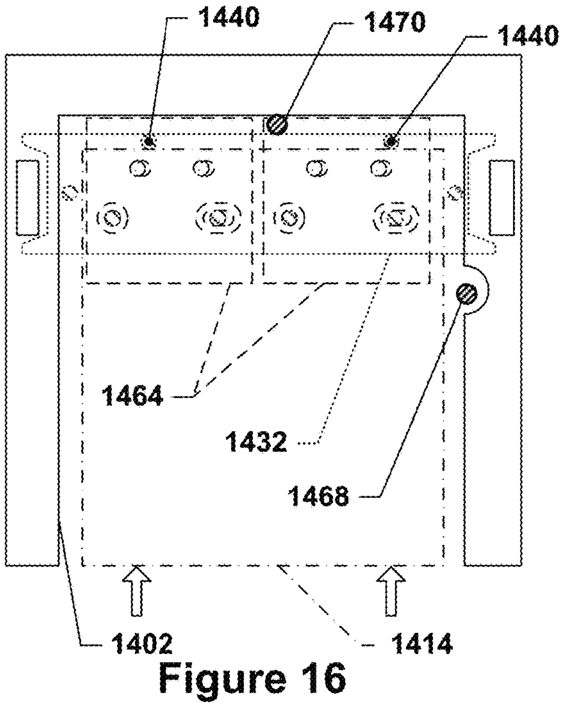

In FIG. 16, the glass plate 1414 has been moved upwards to contact second indexing features 1440 on the support bracket 1432; this contact and the upward movement of the glass plate 1414 causes the support bracket 1432 to move upwards until it contacts longitudinal indexing pin 1470, thus firmly locking the support bracket 1432 in place in the vertical direction (with respect to the Figure orientation; in reality, this is more accurately called the longitudinal direction)—this aligns the fluidic ports 1418 in the glass plate 1414 with the corresponding holes/seals in the support bracket 1432 in the vertical direction.

Figure 17:
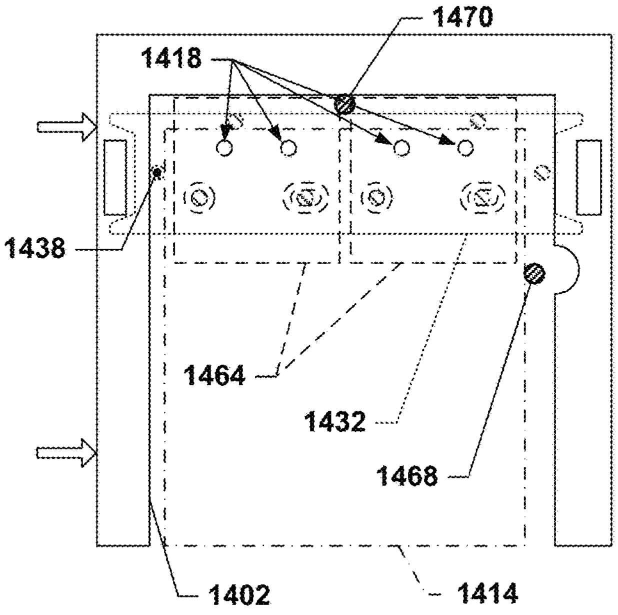

Finally, in FIG. 17, the frame 1402 may be pushed towards the lateral indexing pin 1468. This causes the inside edge of the frame 1402 to contact first indexing feature 1438, which causes the support bracket 1432, in turn, to move towards the lateral indexing pin 1468 until the first indexing feature 1438 also contacts the glass plate 1414 and pushes the opposite side of the glass plate 1414 into contact with the lateral indexing pin 1468. As can be seen, the first fluidic ports 1418 and the respective seal holes and fluidic port block holes are completely aligned, thereby ensuring a consistently-sized flow aperture and proper seal alignment.

The term "about" used throughout this disclosure, including the claims, is used to describe and account for small fluctuations, such as due to variations in processing. For example, unless otherwise specified herein in a particular context, they can refer to less than or equal to ±5%, of the specified value or value equivalent to the specified relationship, such as less than or equal to ±2%, such as less than or equal to ±1%, such as less than or equal to ±0.5%, such as less than or equal to ±0.2%, such as less than or equal to ±0.1%, such as less than or equal to ±0.05%.

As noted earlier, any use of ordinal indicators, e.g., (a), (b), (c) . . . or the like, in this disclosure and claims is to be understood as not conveying any particular order or sequence, except to the extent that such an order or sequence is explicitly indicated. For example, if there are three steps labeled (i), (ii), and (iii), it is to be understood that these steps may be performed in any order (or even concurrently, if not otherwise contraindicated) unless indicated otherwise. For example, if step (ii) involves the handling of an element that is created in step (i), then step (ii) may be viewed as happening at some point after step (i). Similarly, if step (i) involves the handling of an element that is created in step (ii), the reverse is to be understood.

It is also to be understood that the use of "to," e.g., "the apparatus is to be interfaced with a receiver of an analysis device," may be replaceable with language such as "configured to," e.g., "the apparatus is configured to be interfaced with a receiver of an analysis device", or the like.

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. For the sake of brevity, many of those permutations and combinations will not be discussed and/or illustrated separately herein.

What is claimed is:

1. A microfluidic cartridge comprising:

a frame;

a microfluidic plate positioned within the frame, wherein the microfluidic plate floats relative to the frame, the microfluidic plate comprising a first side, a first edge, and a plurality of first fluidic ports located in the first side;

a support bracket positioned within the frame, wherein the support bracket floats relative to the microfluidic plate and the frame, the support bracket comprising:

a plurality of seals supported by the support bracket, each seal of the plurality of seals positioned to interface with a corresponding first fluidic port of the plurality of first fluidic ports, and a plurality of alignment holes corresponding to a first plurality of indexing features located on an analysis device, the plurality of alignment holes configured to align the plurality of seals with corresponding analysis device ports located on the analysis device; and wherein the frame includes a plurality of apertures proximate the first edge of the microfluidic plate, the plurality of apertures corresponding to a second plurality of indexing features located on the analysis device, and wherein the second plurality of indexing features engage the microfluidic plate and the first plurality of indexing features engage the plurality of alignment holes to align the plurality of first fluidic ports, the plurality of seals, and the second fluidic ports when the microfluidic cartridge is installed in the analysis device.

2. The microfluidic cartridge of claim 1, further comprising a plurality of teeth extending from the support bracket, wherein the plurality of teeth engage with the frame and partially constrain movement of the support bracket in a direction parallel to the first edge and relative to the frame.

3. The microfluidic cartridge of claim 1, wherein each seal of the plurality of seals has a through-hole passing through the seal to fluidically connect the plurality of first fluidic ports to the analysis device ports.

4. The microfluidic cartridge of claim 3, wherein the plurality of seals is received in the support bracket.

5. The microfluidic cartridge of claim 3, wherein the plurality of seals is co-molded with the support bracket.

6. The microfluidic cartridge of claim 1, further comprising a plurality of retaining clips that hold the microfluidic plate and the support bracket within the frame.

7. The microfluidic cartridge of claim 6, wherein:

the plurality of retaining clips comprises at least two opposing retaining clips spaced apart by a distance, the microfluidic plate has a width in a direction spanning between the opposing retaining clips that is less than the distance.

8. The microfluidic cartridge of claim 1, wherein the plurality of alignment holes comprises an alignment hole having a countersink portion that narrows to direct a corresponding indexing feature of the second plurality of indexing features toward the center of the alignment hole.

9. The microfluidic cartridge of claim 1, wherein the plurality of alignment holes comprises a circular alignment hole to constrain movement of the support bracket along perpendicular axes of the microfluidic plate and an obround alignment hole to constrain movement of the support bracket along at least one of the perpendicular axes.

10. The microfluidic cartridge of claim 1, wherein:

the frame has a substantially rectangular opening, the microfluidic plate sits within the substantially rectangular opening, the substantially rectangular opening has opposing side walls that face towards one another, and the plurality of apertures comprises two apertures located in one of the opposing side walls.

11. The microfluidic cartridge of claim 10, wherein the frame comprises an overlapping portion that overlaps a portion of the microfluidic plate.

* * * * *